United States Patent Office 3,681,082
Patented Aug. 1, 1972

3,681,082
PIGMENTATION OF EGG YOKE
Ulrich Schwieter, Reinach, Hans Thommen, Therwil, and Harald Weiser, Arlesheim, Switzerland, assignors to Hoffmann-La Roche Inc., Nutley, N.J.
No Drawing. Filed Jan. 15, 1970, Ser. No. 3,196
Claims priority, application Switzerland, Jan. 29, 1969, 1,334/69
Int. Cl. A23k 1/16
U.S. Cl. 99—4
9 Claims

ABSTRACT OF THE DISCLOSURE

Feed or drinking water compositions which provide permanent pigmentation of egg yolks and increased vitamin A sources for poultry are disclosed. The feed compositions contain citranaxanthin as well as carotenoids which impart a yellow color to the egg yolk.

BACKGROUND OF THE INVENTION

Eggs with highly colored yolks are much desired by consumers since products containing such eggs have a desirable yellow color. For example, industrial food producing companies have found it desirable to use eggs with highly colored yolks in order to produce yellow noodles, mayonnaise, baked goods and the like. Also, housewives prefer highly colored eggs for use in omelets, cakes, mayonnaise and the like.

Because of the methods by which poultry are raised for high egg production, the natural food sources essential for the pigmentation of egg yolks are not always in the feed or drinking water in sufficient quantities present to provide satisfactory color to the egg yolks.

Attempts to intensify the pigmentation of egg yolks with the use of carotenoid dyes in the pigment-poor feed or drinking water of poultry have met with some success. The carotenoids, such as canthaxanthin and zeaxanthin, which are used, however, have no nutritional value or vitamin A activity since they are only dyes. It has become desirable, therefore, to improve the nutritional value of the poultry feed or drinking water while increasing their yolk pigmentation properties and obtain desirable color and color intensity of the yolk.

BRIEF DESCRIPTION OF THE INVENTION

This invention relates to poultry feed and drinking water compositions containing as an egg yolk pigmenting agent and provitamin A source, citranaxanthin in combination with a carotenoid dye.

DETAILED DESCRIPTION OF THE INVENTION

According to this invention, poultry feeds and drinking water which are normally intended for administration to laying hens are fortified with the provitamin A compound citranaxanthin to provide a source of vitamin A for the poultry and to provide enhanced orange-yellow pigmentation of the yolks of the eggs produced by the poultry. In combination with the citranaxanthin, carotenoids that enhance the pigmentation properties of citranaxanthin and provide a yellow color are used. Typical suitable carotenoids are zeaxanthin, lutein, $\beta$-apo-8'-carotenal ($C_{30}$) and $\beta$-apo-8'-carotenoic acid ($C_{30}$) ethyl ester.

The use of citranaxanthin alone in the pigment-poor feed or drinking water will impart an increased orange color to the egg yolks. This coloring, while appearing desirable to the eye, does not have sufficient pigmentation power to impart adequate color to foods prepared from them, e.g., yellow noodles or baked goods.

The addition of carotenoids to the citranaxanthin containing pigment-poor basic feed or drinking water will impart a yellow color and improve the pigment content of the yolks to the extent that they are suitable and desirable for the preparation of yellow colored foods, e.g., yellow noodles and baked goods.

The carotenoids which are suitable for combining with the citranaxanthin to enhance the pigmentation of the egg yolks are typically those which are non-toxic and have yellow pigmenting properties. Typical suitable carotenoids are zeaxanthin, lutein, $\beta$-apo-8'-carotenal ($C_{30}$), $\beta$-apo-8'-carotenoic acid ($C_{30}$) ethyl ester or mixtures thereof.

Preferably, $\beta$-apo-8'-carotenal ($C_{30}$) or $\beta$-apo-8'-carotenoic acid ($C_{30}$) ethyl ester or mixtures thereof are used.

Exact measurements demonstrate that a certain amount of citranaxanthin alone and a mixture of this amount of citranaxanthin with the same amount of $\beta$-apo-8'-carotenoic acid ($C_{30}$) ethyl ester are deposited in the egg yolk in a ratio of about 1:3.5, calculated as $\beta$-carotene.

In carrying out the invention, citranaxanthin and one or more yellow pigmenting carotenoid are incorporated into poultry feed, poultry feed mix or poultry drinking water by a simple admixing of the ingredients. The active ingredients can be added in the form of a dispersion or in a stabilized form, such as imbedded in gelatin.

The quantity of active ingredient which is present in the products is variable within wide limits. In general, in the form in which it will be made available to poultry, the compositions of the invention will contain from about 2 to 12, preferably 2 to 8 parts per million, by weight, of citranaxanthin and from about 2 to 12, preferably 2 to 8 parts per million, by weight, of one or more carotenoid which will impart yellow pigmentation to egg yolks.

The compositions of the invention are fed, ad libitum, to laying hens to achieve an enhanced pigmentation effect in the egg yolks as well as to increase the intake of materials with provitamin A activity.

The citranaxanthin present in the feed and represented by the following formula

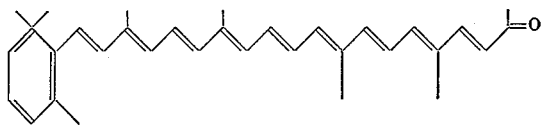

can be obtained by extraction from citrus fruits, particularly from Sinton citrangequat, or synthetically, starting, for example, with $\beta$-apo-8'-carotenal ($C_{30}$) by condensation with acetone.

Citranaxanthin may be obtained from Sinton citrangequat, for example, by extracting the peels of these fruits with acetone, partitioning the acetone extract between petroleum ether (boiling range 30–60° C.) and 90% methanol, and separating and chromatographing the upper phase. Citranaxanthin melts at 156° C. after crystallization from petroleum ether.

Citranaxanthin may be prepared synthetically, for example, by dissolving $\beta$-apo-8'-carotenal ($C_{30}$) in equal amounts of acetone and ethanol and adding alcoholic potassium hydroxide dropwise with agitation at room temperature, under nitrogen. The citranaxanthin obtained from the reaction mixture by extraction with petroleum ether melts at 155–156° C. after crystallization from petroleum ether.

The compositions of this invention are readily prepared. In general, the preparative method involves simply the introduction and mixing of the citranaxanthin and carotenoids with the feed or drinking water. In the preferred embodiment of the invention, the pigmentation ingredients are added to and mixed with a conventional poultry feed.

The active ingredients can be added to the feed in the form of a dispersion in an aqueous solution or stabilized in a matrix of gelatin. Uniform distribution of the active ingredients throughout the feed is achieved by simple mixing. While the invention is primarily designed to provide a dry poultry feed having enhanced pigmentation activity, it embraces also liquid compositions, such as are obtained by adding the pigmenters to the water supply of the poultry.

The quantity of citranaxanthin which is used in the practice of this invention is variable. In general, a sufficient amount will be made available to the poultry to achieve the desired degree of coloring of the yolk and increased source of vitamin A. The amount required in any instance to achieve the desired objects will depend upon the nature and quality of the feed which is made available to the birds since some of them contain larger amounts of natural pigmenters than others. However, since the feed or drinking water used for laying hens is usually very low in natural pigmenters, it is generally desirable to provide, in the finished feed or water composition, about 0.0002% to about 0.0008% by weight, i.e., about 2 to 8 parts per million or about 2 mg./kg. to 8 mg./kg., of citranaxanthin. In addition, carotenoid pigmenting materials are included in the feed or drinking water compositions. To insure the proper yellow coloring of the yolk, it is preferred to use yellow coloring carotenoids. Typical suitable carotenoids are zeaxanthin, lutein, $\beta$-apo-8'-carotenal ($C_{30}$), $\beta$-apo-8'-carotenoic acid ($C_{30}$) ethyl ester or mixtures thereof.

The amount of yellow pigmenting carotenoids provided depends upon the requirements which are lacking in the feed and which are thus needed to provide the proper yellow color to the yolks. Generally, about 0.0002% to 0.0012% by weight of the feed are provided.

It is within the scope of the invention also to provide products which are more highly concentrated in their content of yolk pigmenters and which are capable of being further diluted with feed or water prior to being made available to the birds, for example, feed premixes of any desired concentration are provided.

The present invention constitutes a substantial advance in the art since it provides an economical and commercially practical means for providing permanent pigmentation to egg yolks as well as adding provitamin A values to the poultry feed and drinking water.

The following examples are for illustrative purposes only.

Example 1

This example illustrates the effect on pigmentation of egg yolks with citranaxanthin and mixtures of citranaxanthin with carotenoids imparting yellow color as an additive to a poultry feed poor in pigments (containing approximately 1 mg. natural carotenoids per kg. of feed).

Individual groups of laying hens received the basic feed either without any additive or with various pigmentation additives. The eggs of each group of animals were collected beginning with the 14th day of the experiment. The hue of the egg yolks was determined by comparison with the Roche color scale [Poultry Sci., vol. 48 (1969), No. 3, 767–779]. This color scale shows increasing values (from 1 to 15) which values allow to define the color of the egg yolk.

| Animal group: | Egg yolk pigmentation color grade of color scale |
|---|---|
| Basic feed alone | 1 |
| Basic feed+3 mg./kg. citranaxanthin | (1) |
| Basic feed+5 mg./kg. $\beta$-apo-8'-carotenoic acid ($C_{30}$) ethyl ester | 7 |
| Basic feed+3 mg./kg. citranaxanthin+5 mg./kg. $\beta$-apo-8'-carotenoic acid ($C_{30}$) ethyl ester | 9–10 |
| Basic feed+6 mg./kg. citranaxanthin | (1) |
| Basic feed+10 mg./kg. $\beta$-apo-8'-carotenal ($C_{30}$) | 9 |
| Basic feed+6 mg./kg. citranaxanthin+10 mg./kg. $\beta$-apo-8'-carotenal ($C_{30}$) | 13–14 |

[1] Not covered by color scale.

The table demonstrates:

Citranaxanthin alone shifts the color of the egg yolk to an undesired range outside of the color scale.

Citranaxanthin in combination with a yellow pigmenting carotenoid considerably augments the moderately strong yellow color which is achieved by the yellow pigmenting carotenoid alone.

Example 2

This example illustrates egg yolk pigmentation with citranaxanthin and mixtures of citranaxanthin with carotenoids imparting yellow color, as addition to normally pigmented poultry feed (containing approximately 15 mg. natural carotenoids per kg. of feed).

Individual groups of laying hens received the basic feed either without any addition or with various pigmentation additives. The eggs of each group of animals were collected starting on the 14th day of the experiment, and the amounts of carotenoids deposited in the egg yolks were determined by analysis and calculated as $\beta$-carotene in mcg./g. of yolk.

| Animal group: | Amount of pigment in egg yolk as mcg./g. of yolk |
|---|---|
| Basic feed alone | 15 |
| Basic feed+3 mg./kg. citranaxanthin | 17.8 |
| Basic feed+4.5 mg./kg. citranaxanthin | 19.8 |
| Basic feed+3 mg./kg. $\beta$-apo-8'-carotenoic acid ($C_{30}$) ethyl ester | 23.4 |
| Basic feed+4.5 mg./kg. $\beta$-apo-8'-carotenoic acid ($C_{30}$) ethyl ester | 26.7 |
| Basic feed+3 mg./kg. citranaxanthin+3 mg./kg. $\beta$-apo-8'-carotenoic acid ($C_{30}$) ethyl ester | 26.2 |
| Basic feed+4.5 mg./kg. citranaxanthin+4.5 mg./kg. $\beta$-apo-8'-carotenoic acid ($C_{30}$) ethyl ester | 31.2 |

The table demonstrates that the amount of carotenoids deposited in the egg yolk is lower in the case where only citranaxanthin is added to the poultry feed and is substantially larger in the case where a mixture of citranaxanthin with a yellow pigmenting carotenoid is employed.

Example 3

This example illustrates the preparation of a poultry feed suitable for egg yolk pigmentation, using a basic feed that is poor in pigments and has the following compositions:

| | Percent |
|---|---|
| Milo corn, milled | 70.00 |
| Soybean extraction groats | 10.00 |
| Herring meal | 3.00 |
| Cod fish meal | 2.00 |
| Whey (dry) | 1.60 |
| Barley, milled | 4.00 |
| Oats, milled | 2.00 |
| Wheat, milled | 1.75 |
| Bone meal | 2.00 |
| Calcium carbonate | 3.025 |
| Rock salt | 0.25 |
| Vitamin mixture [1] | 0.225 |
| Mineral mixture [2] | 0.15 |

[1] Vitamins/kg. feed:
8,000 IU vitamin A
800 IU vitamin $D_3$
25 IU vitamin E
2 mg. vitamin $K_3$
3.75 mg. vitamin $B_2$
10.25 mg. Ca-panthothenate
32.50 mg. nicotinic acid
62.50 mg. choline chloride
2.5 mg. vitamin $B_1$
3.5 mg. vitamin $B_6$
6.5 mcg. vitamin $B_{12}$
0.65 mg. folic acid

[2] Minerals/kg. feed:
15 mg. iron
60 mg. manganese
60 mg. zinc
3.75 mg. copper
3 mg. iodine
0.3 mg. cobalt The basic feed for laying hens with the above composition (1 kg.) is mixed homogeneously with 4.5 mg. citranaxanthin and
10.0 mg. β-apo-8'-carotenoic acid ($C_{30}$) ethyl ester.

Calculated as β-carotene, the content of pigment in the yolks of eggs collected approximately from the 14th day after the beginning of the feeding is approximately 29 mcg./g. of yolk.

Example 4

This example illustrates the preparation of a poultry feed suitable for egg yolk pigmentation with the use of a normally pigmented basic feed having the following composition:

| | Percent |
|---|---|
| Corn, milled | 55.00 |
| Oats, milled | 5.00 |
| Wheat meal | 2.66 |
| Fish meal | 5.00 |
| Soybean extraction groats | 8.00 |
| Carcass meal | 2.00 |
| Calcium carbonate | 6.00 |
| Maisarin | 4.00 |
| Zein, yellow corn | 4.00 |
| Grass-green meal | 3.00 |
| Tapioca flour | 2.50 |
| Soybean oil | 1.00 |
| Whey powder | 1.00 |
| Vitamin mixture [1] | 0.34 |
| Mineral mixture [2] | 0.50 |

[1] Vitamins/kg. feed:
12,000 IU vitamin A
1,500 IU vitamin $D_3$
6 IU vitamin E
20 mg. niacin
4 mg. vitamin $B_2$
3 mg. vitamin $K_3$
8 mg. Ca-panthothenate
15 mcg. vitamin $B_{12}$
500 mg. choline chloride
44 mg. vitamin C

[2] Minerals/kg. feed:
950 mg. manganese
225 mg. iron
225 mg. zinc
25 mg. copper
1.5 mg. cobalt
0.4 mg. iodine The basic feed for laying hens of the above composition (1 kg.) is mixed homogeneously with 4.5 mg. citranaxanthin and
2.0 mg. β-apo-8'-carotenoic acid ($C_{30}$) ethyl ester.

Calculated as β-carotene, the content of pigment in the yolks of the eggs collected approximately from the 14th day after the starting of the feeding is approximately 30 mcg./g. of yolk.

We claim:
1. A composition having increased egg yolk pigmentation activity comprising (1) a poultry feed or drinking water, (2) from about 0.0002% to about 0.0012% by weight of citranaxanthin and (3) from about 0.0002% to about 0.0012% by weight of a carotenoid selected from the group consisting of zeaxanthin, lutein, β-apo-8'-carotenal ($C_{30}$), β-apo-8'-carotenoic acid ($C_{30}$) ethyl ester, and mixtures thereof which imparts a yellow color to the egg yolk.

2. The composition of claim 1, comprising from about 0.0002% to about 0.0008% by weight of citranaxanthin and from about 0.0002% to about 0.0008% by weight of a yellow coloring carotenoid.

3. The composition of claim 1 wherein ingredient (3) is zeaxanthin.

4. The composition of claim 1 wherein ingredient (3) is β-apo-8'-carotenal ($C_{30}$).

5. The composition of claim 1 wherein ingredient (3) is β-apo-8'-carotenic acid ($C_{30}$) ethyl ester.

6. The method of increasing the pigmentation of poultry egg yolk which comprises feeding to laying hens a composition comprising (1) a poultry feed or drinking water, (2) from about 0.0002% to about 0.0012% by weight of citranaxanthin and (3) from about 0.0002% to about 0.0012% by weight of a yellow coloring carotenoid selected from the group consisting of zeaxanthin, lutein, β-apo-8'-carotenal ($C_{30}$), β-apo-8'-carotenoic acid ($C_{30}$) ethyl ester, and mixtures thereof.

7. The method of claim 6, which comprises feeding to laying hens a composition comprising from about 0.0002% to about 0.0008% by weight of citranaxanthin and from about 0.0002% to about 0.0008% by weight of a yellow coloring carotenoid.

8. The method of claim 6 wherein ingredient (3) is β-apo-8'-carotenal ($C_{30}$).

9. The method of claim 6 wherein ingredient (3) is β-apo-8'-carotenoic acid ($C_{30}$) ethyl ester.

References Cited

UNITED STATES PATENTS

| | | | |
|---|---|---|---|
| 3,321,315 | 5/1967 | Yokoyama | 99—2 |
| 3,539,686 | 11/1970 | Rosenberg | 99—2 |
| 3,206,316 | 9/1965 | Heinrich | 99—11 |
| 3,014,052 | 12/1961 | Waldemar | 99—148 |

OTHER REFERENCES

B. Czernicki et al.: Chemical Abstracts, vol. 64, 1963, 10566b, "Influence of Pure Carotenoids . . . on Yolk Color."

B. Borenstein et al.: Advances in Food Research, 1966, pp. 209, 210, 218, 219, 248–253.

NORMAN YUDKOFF, Primary Examiner

C. P. RIBANDO, Assistant Examiner

U.S. Cl. X.R.

99—2C, 2V, 11, 148